United States Patent
Kuroki (10) Patent No.: US 10,135,255 B2
(45) Date of Patent: Nov. 20, 2018

(54) MOTOR CONTROL APPARATUS IN WHICH POWER REGENERATION ARE ADJUSTED, CONTROLLER FOR CONVERTER, MACHINE LEARNING APPARATUS AND METHOD THEREOF

(71) Applicant: FANUC Corporation, Yamanashi (JP)

(72) Inventor: Wataru Kuroki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 311 days.

(21) Appl. No.: 15/046,966

(22) Filed: Feb. 18, 2016

(65) Prior Publication Data

US 2017/0033565 A1 Feb. 2, 2017

(30) Foreign Application Priority Data

Jul. 31, 2015 (JP) .................................. 2015-151643

(51) Int. Cl.
| | |
|---|---|
| *H02J 4/00* | (2006.01) |
| *H02M 5/458* | (2006.01) |
| *G05B 13/02* | (2006.01) |
| *H02P 23/12* | (2006.01) |
| *H02P 23/00* | (2016.01) |
| *H02M 1/32* | (2007.01) |
| *H02P 3/18* | (2006.01) |

(52) U.S. Cl.
CPC .............. *H02J 4/00* (2013.01); *G05B 13/028* (2013.01); *H02M 5/4585* (2013.01); *H02P 23/0004* (2013.01); *H02P 23/12* (2013.01); *H02M 1/32* (2013.01); *H02P 3/18* (2013.01)

(58) Field of Classification Search
CPC ...... G05B 13/028; H02M 1/32; H02M 5/4585
See application file for complete search history.

(56) References Cited

U.S. PATENT DOCUMENTS

| | | | |
|---|---|---|---|
| 2011/0059427 A1 | 3/2011 | Hans et al. | |
| 2012/0243265 A1* | 9/2012 | Kurokawa | H02M 3/33507 363/21.01 |
| 2014/0002141 A1* | 1/2014 | Barrenscheen | H02M 1/08 327/108 |

(Continued)

FOREIGN PATENT DOCUMENTS

| | | |
|---|---|---|
| CN | 102023570 A | 4/2011 |
| CN | 104471828 A | 3/2015 |
| DE | 102012016700 A1 | 5/2014 |

(Continued)

*Primary Examiner* — Muhammad S Islam
(74) *Attorney, Agent, or Firm* — Hauptman Ham, LLP (57) ABSTRACT

A machine learning apparatus includes a state observation unit which observes a state variable including at least one of data associated with the value of a DC voltage in a DC link, data associated with the amount of power supply regeneration representing the amount of power returned from the DC link to an AC power supply by a power supply regeneration operation by a converter, and data associated with the occurrence or nonoccurrence of an overvoltage alarm indicating that the DC voltage of the DC link has exceeded a preset overvoltage alarm level, and a learning unit learns conditions associated with the power supply regeneration operation by the converter, in accordance with a training data set defined by the state variable.

13 Claims, 5 Drawing Sheets

(56) References Cited

U.S. PATENT DOCUMENTS

2014/0070743 A1\* 3/2014 Yoshida ................ H02P 29/024
                                                          318/400.22
2014/0250036 A1    9/2014 Izhikevich et al.

FOREIGN PATENT DOCUMENTS

| JP | 8-47279 A | 2/1996 |
|---|---|---|
| JP | 2567830 B2 | 12/1996 |
| JP | 10-164701 A | 6/1998 |
| JP | 2012-213258 A | 11/2012 |
| JP | 2013-172636 A | 9/2013 |
| JP | 5319318 B2 | 10/2013 |

\* cited by examiner

FIG. 7 ptMOTOR CONTROL APPARATUS IN WHICH POWER REGENERATION ARE ADJUSTED, CONTROLLER FOR CONVERTER, MACHINE LEARNING APPARATUS AND METHOD THEREOF

BACKGROUND OF THE INVENTION

1. Field of the Invention

The present invention relates to a motor control apparatus which converts AC power supplied from an AC power supply into DC power, outputs the DC power to a DC link, further converts the DC power into AC power for driving a motor, and supplies the AC power to the motor, a controller for a converter used for the motor control apparatus, and a machine learning apparatus and method for the controller for a converter.

2. Description of the Related Art

In a motor control apparatus which drives motors within a machine tool, a forging machine, an injection molding machine, an industrial machine, or various robots, AC power supplied from an AC power supply is temporarily converted into DC power, which is further converted into AC power. The AC power is used as drive power for a motor provided for each drive shaft.

Figure 7:
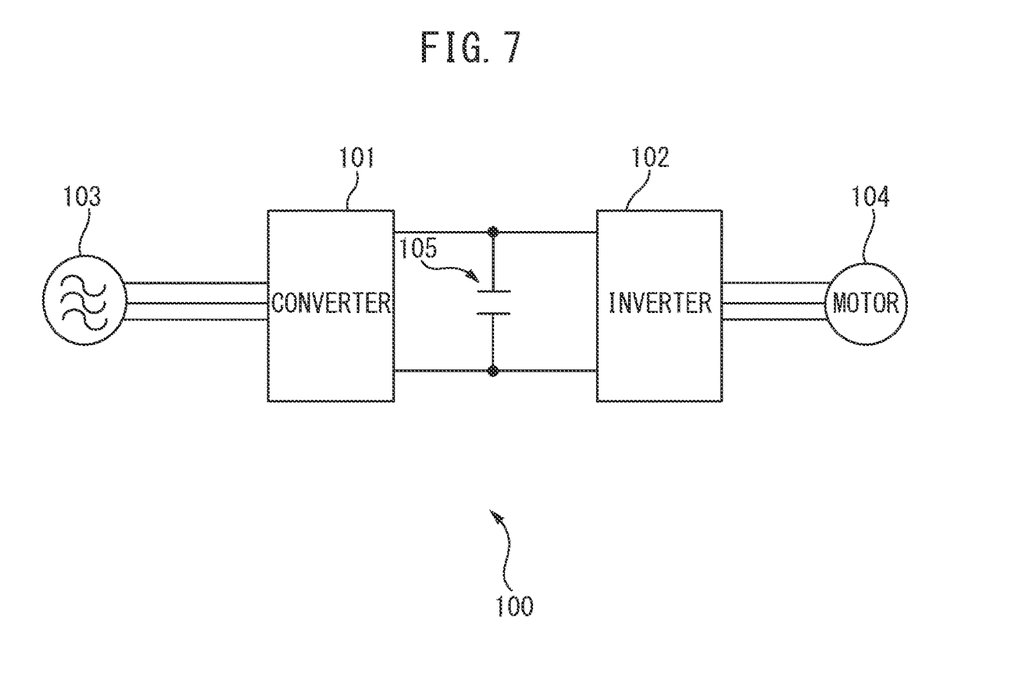
FIG. 7 is a block diagram illustrating the configuration of a general motor control apparatus.

FIG. 7 is a block diagram illustrating the configuration of a general motor control apparatus. A motor control apparatus 100 includes a converter 101 and an inverter 102. The converter 101 converts AC power from a commercial AC power supply (to be simply referred to as an "AC power supply" hereinafter) 103 into DC power. The inverter 102 converts DC power output from the converter 101 into AC power having desired frequencies and supplied as drive power for a motor 104 or converts AC power regenerated from the motor 104 into DC power. The motor control apparatus 100 controls the velocity, torque, or rotor position of the motor 104 connected to the AC terminal of the inverter 102. For the sake of illustrative simplicity, FIG. 7 illustrates driving of only one motor 104. In general, when a plurality of drive shafts are driven, a motor is provided for each drive shaft. In this case, a plurality of inverters are used to independently supply drive power to each motor.

The converter 101 is connected to the inverter 102 via a DC link (Direct-Current link). A DC link capacitor 105 is provided in the DC link. The DC link capacitor 105 has a storage function for storing DC power and a smoothing function for suppressing pulsation of the DC output of the converter 101.

In response to the recent demand for energy saving, as a converter for a motor control apparatus, a power supply regeneration converter which can return regenerative power generated upon motor deceleration to an AC power supply, as disclosed in, e.g., Japanese Patent No. 2567830, is widely used.

A power supply regeneration converter has a function for converting AC power supplied from an AC power supply into DC power and outputting the DC power to a DC link, as well as a function for converting DC power supplied from the DC link into AC power and outputting the AC power to the AC power supply, upon motor deceleration. Regenerative power generated upon motor deceleration is converted from AC power into DC power by an inverter. The DC power is input to the converter via the DC link and further converted by the converter into AC power, which is supplied to the AC power supply for power supply regeneration.

Examples of the power supply regeneration converter may include a PWM-controlled rectifying circuit and a 120-degree conduction rectifying circuit.

Of these examples, the PWM-controlled rectifying circuit is implemented in a bridge circuit consisting of a semiconductor switching element and a diode connected in inverse parallel to it, as disclosed in, e.g., Japanese Unexamined Patent Publication No. H8-47279. PWM switching control of an internal semiconductor switching element of this circuit is performed to convert power between AC power in the AC power supply and DC power in the DC link.

In such a motor control apparatus, the DC voltage applied across the two terminals of a DC link capacitor provided in the DC link (to be sometimes simply referred to as the "DC link voltage" hereinafter) varies depending on the amount of drive power consumed by a motor or the amount of regenerative power generated by the motor, the amount of power conversion from AC power into DC power or from DC power into AC power by a converter, and the amount of power conversion from DC power into AC power or from AC power into DC power by an inverter. At the time of, e.g., motor deceleration, AC regenerative power generated by the motor is converted into DC power by the inverter. A conversion operation from DC power into AC power by the converter (to be referred to as "a power supply regeneration operation by the converter" hereinafter) is adjusted to, in turn, adjust the DC link voltage to a voltage that does not break down the DC link capacitor and respective elements in the converter and the inverter.

Several methods for controlling a power supply regeneration operation by the converter in accordance with the DC link voltage have been proposed, as disclosed in, e.g., Japanese Patent No. 5319318.

As described above, AC regenerative power generated by the motor upon motor deceleration is converted into DC power by the inverter and the DC power is returned to the DC link, so that the DC link voltage rises. When the regenerative power raises the DC link voltage too much, the DC link capacitor and respective elements in the converter and the inverter break down, or the motor control apparatus stops due to an overvoltage alarm set to prevent breakdown. Therefore, the converter preferably performs a power supply regeneration operation to return energy in the DC link to the AC power supply. On the other hand, power supply regeneration by the converter causes a switching loss, leading to heat generation in the semiconductor switching element in the converter. Especially when power supply regeneration is performed for a long time, the semiconductor switching element in the converter generates heat in large quantities. Then, the semiconductor switching element in the converter suffers thermal breakdown or the motor control apparatus stops due to an overload alarm set for protection of the semiconductor switching element in the converter from overheat. For this reason, it is very important to perform adjustment for an efficient, appropriate power supply regeneration operation by the converter so that the DC link voltage does not rise too much, while minimizing the execution of power supply regeneration. Such adjustment is performed by the designer in the design stage of a motor control apparatus or by the operator in the adjustment stage of a machine equipped with the motor control apparatus. It is troublesome to manually perform such adjustment in accordance with the operating states of individual machines.

SUMMARY OF INVENTION

In consideration of the above-described problem, it is an object of the present invention to provide a motor control apparatus which can efficiently perform a power supply regeneration operation for converting DC power in a DC link used to generate AC power for motor driving into AC power, and returning the AC power to an AC power supply, in a converter which generates DC power in the DC link by conversion from AC power in the AC power supply, a controller for a converter used for the motor control apparatus, and a machine learning apparatus and method for the controller for a converter.

In order to realize the above-described object, provided is a machine learning apparatus which learns a condition associated with a power supply regeneration operation for converting DC power in a DC link used to generate AC power for motor driving into AC power, and returning the AC power to an AC power supply, in a converter which generates DC power in the DC link by conversion from AC power in the AC power supply, includes a state observation unit which observes a state variable including at least one of data associated with the value of a DC voltage in the DC link, data associated with the amount of power supply regeneration representing the amount of power returned from the DC link to the AC power supply by the power supply regeneration operation by the converter, and data associated with the occurrence or nonoccurrence of an overvoltage alarm indicating that the DC voltage of the DC link has exceeded a preset overvoltage alarm level, and a learning unit which learns a condition associated with the power supply regeneration operation by the converter, in accordance with a training data set defined by the state variable.

The learning unit may include a reward computation unit which computes a reward based on the state variable, and a function update unit which updates, based on the reward, a function for changing a power supply regeneration starting voltage representing a voltage defined in the DC link as a criterion for starting a power supply regeneration operation by the converter, and a power supply regeneration stopping voltage representing a voltage defined in the DC link as a criterion for stopping the power supply regeneration operation started by the converter.

The reward computation unit may increase the reward when the current DC voltage of the DC link observed by the state observation unit is higher than the DC voltage of the DC link observed by the state observation unit earlier than the current DC voltage of the DC link.

The reward computation unit may reduce the reward when the current DC voltage of the DC link observed by the state observation unit is lower than the DC voltage of the DC link observed by the state observation unit earlier than the current DC voltage of the DC link.

The reward computation unit may increase the reward when the current amount of power supply regeneration observed by the state observation unit is smaller than the amount of power supply regeneration observed by the state observation unit earlier than the current amount of power supply regeneration.

The reward computation unit may reduce the reward when the current amount of power supply regeneration observed by the state observation unit is larger than the amount of power supply regeneration observed by the state observation unit earlier than the current amount of power supply regeneration.

The reward computation unit may increase the reward when the nonoccurrence of the overvoltage alarm is observed by the state observation unit.

The reward computation unit may reduce the reward when the occurrence of the overvoltage alarm is observed by the state observation unit.

The learning unit may be configured to learn the condition in accordance with the training data set obtained for each of a plurality of converters.

Further provided is a controller for a converter, including the above-described machine learning apparatus, further including a decision-making unit which decides the power supply regeneration starting voltage and the power supply regeneration stopping voltage in response to input of the current state variable, based on the result of learning by the learning unit in accordance with the training data set, and a converter control unit controls the power conversion operation of a converter which performs conversion between AC power in the AC power supply and DC power in the DC link. The converter control unit issues an instruction to the converter to start a power supply regeneration operation when the DC voltage of the DC link rises and becomes higher than the power supply regeneration starting voltage decided by the decision-making unit, and, after the start of a power supply regeneration operation by the converter, issues an instruction to the converter to stop the power supply regeneration operation when the DC voltage of the DC link drops and becomes lower than the power supply regeneration stopping voltage decided by the decision-making unit.

The learning unit may be configured to re-learn and update the condition in accordance with an additional training data set defined by the current state variable.

The controller for a converter may further include at least one of a DC voltage measuring unit which measures the DC voltage of the DC link, a power supply regeneration amount measuring unit which measures the amount of power supply regeneration, and an overvoltage alarm receiver unit which receives data associated with the occurrence or nonoccurrence of the overvoltage alarm.

A motor control apparatus including the above-described controller for a converter further includes an inverter control unit which controls the power conversion operation of an inverter which performs conversion between DC power in the DC link and AC power on the AC motor side.

Moreover provided is a machine learning method for learning a condition associated with a power supply regeneration operation for converting DC power in a DC link used to generate AC power for motor driving into AC power, and returning the AC power to an AC power supply, in a converter which generates DC power in the DC link by conversion from AC power supplied from the AC power supply. The method includes the steps of observing a state variable including at least one of data associated with the value of a DC voltage in the DC link, data associated with the amount of power supply regeneration representing the amount of power returned from the DC link to the AC power supply by the power supply regeneration operation by the converter, and data associated with the occurrence or nonoccurrence of an overvoltage alarm indicating that the DC voltage of the DC link has exceeded a preset overvoltage alarm level, and learning a condition associated with the power supply regeneration operation by the converter, in accordance with a training data set defined by the state variable.

BRIEF DESCRIPTION OF THE DRAWINGS

The present invention will be more clearly understood by reference to the accompanying drawings, in which.

DETAILED DESCRIPTION

A motor control apparatus which adjusts power supply regeneration, a controller for a converter, and a machine learning apparatus and method will be described below with reference to the drawings. However, it should be understood that the present invention is limited to neither the drawings nor the following embodiment.

Figure 1:
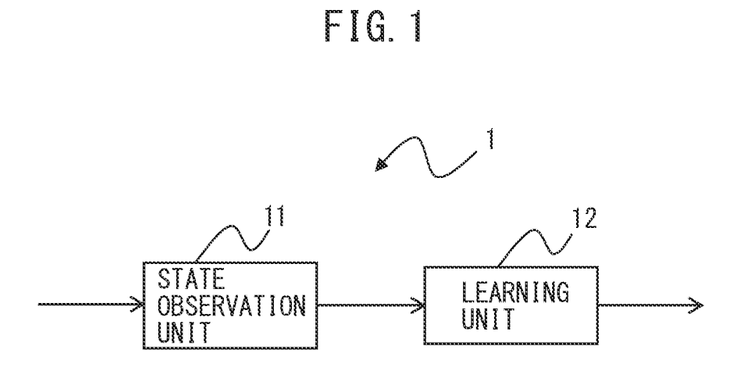
FIG. 1 is a principle block diagram illustrating a machine learning apparatus according to an embodiment.

FIG. 1 is a principle block diagram illustrating a machine learning apparatus according to an embodiment. The same reference numerals in different drawings denote components having the same functions hereinafter.

A motor control apparatus includes a converter and an inverter. The converter converts AC power from an AC power supply into DC power and outputs the DC power to a DC link. The inverter converts DC power in the DC link into AC power having desired frequencies and supplied as drive power for a motor and supplies the AC power to the motor, or converts AC power regenerated from the motor into DC power and outputs the DC power to the DC link. In the motor control apparatus, a machine learning apparatus 1 according to the embodiment is configured to learn conditions associated with a power supply regeneration operation, for converting DC power in the DC link into AC power and returning the AC power to an AC power supply, which is executed by the converter. In other words, the machine learning apparatus 1 learns a power supply regeneration starting voltage and a power supply regeneration stopping voltage as conditions which are associated with a power supply regeneration operation and can achieve an efficient power supply regeneration operation of a converter 101.

The machine learning apparatus 1 includes a state observation unit 11 and a learning unit 12.

The state observation unit 11 observes, as a training data set, a state variable including at least one of data associated with the value of a DC voltage in the DC link, data associated with the amount of power supply regeneration representing the amount of power returned from the DC link to the AC power supply by the power supply regeneration operation by the converter, and data associated with the occurrence or nonoccurrence of an overvoltage alarm indicating that the DC voltage of the DC link has exceeded a preset overvoltage alarm level.

The learning unit 12 learns a power supply regeneration starting voltage and a power supply regeneration stopping voltage as conditions associated with the power supply regeneration operation by the converter, in accordance with a training data set defined by the state variable. Training data sets may be obtained from a plurality of converters. In this case, the learning unit 12 learns conditions associated with the power supply regeneration operation in accordance with the training data sets obtained for the plurality of converters.

Figure 2:
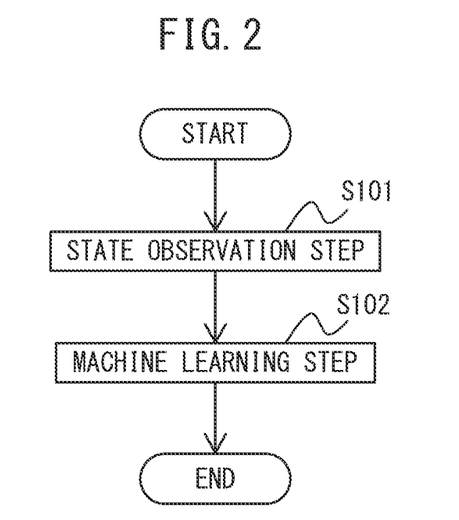
FIG. 2 is a flowchart illustrating the operation principle of a machine learning method according to the embodiment.

FIG. 2 is a flowchart illustrating the operation principle of a machine learning method according to the embodiment. A machine learning method for learning conditions associated with a power supply regeneration operation for converting DC power in a DC link used to generate AC power for motor driving into AC power, and returning the AC power to an AC power supply, in a converter which generates DC power in the DC link by conversion from AC power supplied from the AC power supply includes state observation step S101 and machine learning step S102.

State observation step S101 is executed by the state observation unit 11. In other words, the state observation unit 11 observes a state variable including at least one of data associated with the value of a DC voltage in the DC link, data associated with the amount of power supply regeneration representing the amount of power returned from the DC link to the AC power supply by the power supply regeneration operation by the converter, and data associated with the occurrence or nonoccurrence of an overvoltage alarm indicating that the DC voltage of the DC link has exceeded a preset overvoltage alarm level.

Machine learning step S102 is executed by the learning unit 12, which learns conditions associated with the power supply regeneration operation by the converter, in accordance with a training data set defined by the state variable.

The learning unit 12 may employ any type of learning algorithm. The application of reinforcement learning will be taken as an example below. In reinforcement learning, the agent (the subject of an action) in a given environment observes the current state to decide an action to be taken. The agent selects an action to receive a reward from the environment, thereby learning a measure which achieves the greatest reward through a series of actions. As typical methods for reinforcement learning, Q-learning and TD-learning are known. In, e.g., Q-learning, the general update expression (action value table) for an action value function $Q(s, a)$ is given by:

$$Q(s_t,a_t) \leftarrow Q(s_t,a_t)+\alpha(r_{t+1}+\gamma \max_a Q(s_{t+1},a)-Q(s_t,a_t)) \quad (1)$$

where $s_t$ is the environment at time t and $a_t$ is the action at time t. Upon the action $a_t$, the environment changes to $s_{t+1}$. $r_{t+1}$ is the reward received upon a change in environment, $\gamma$ is the discount factor, and $\alpha$ is the learning factor. When Q-learning is adopted, the power supply regeneration starting voltage and the power supply regeneration stopping voltage are defined as actions $a_t$.

Figure 3:
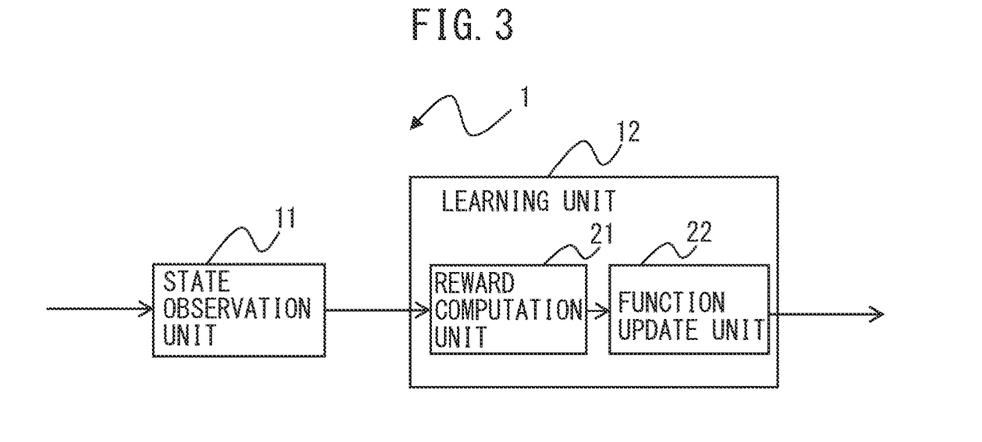
FIG. 3 is a principle block diagram illustrating a machine learning apparatus using reinforcement learning according to the embodiment.

FIG. 3 is a principle block diagram illustrating a machine learning apparatus using reinforcement learning according to the embodiment. The learning unit 12 includes a reward computation unit 21 and a function update unit 22. The reward computation unit 21 computes a reward based on the state variable. The function update unit 22 updates, based on the reward, a function for changing a power supply regeneration starting voltage representing a voltage defined in the DC link as a criterion for starting a power supply regeneration operation by the converter, and a power supply regeneration stopping voltage representing a voltage defined in the DC link as a criterion for stopping the power supply regeneration operation started by the converter. In, e.g., Q-learning, the action value function $Q(s, a)$ presented in expression (1) is used as a function for changing the power supply regeneration starting voltage and the power supply regeneration stopping voltage defined as actions $a_t$. Since other circuit components are the same as those illustrated as FIG. 1, the same reference numerals denote the same circuit components, and a detailed description thereof will not be given.

Figure 4:
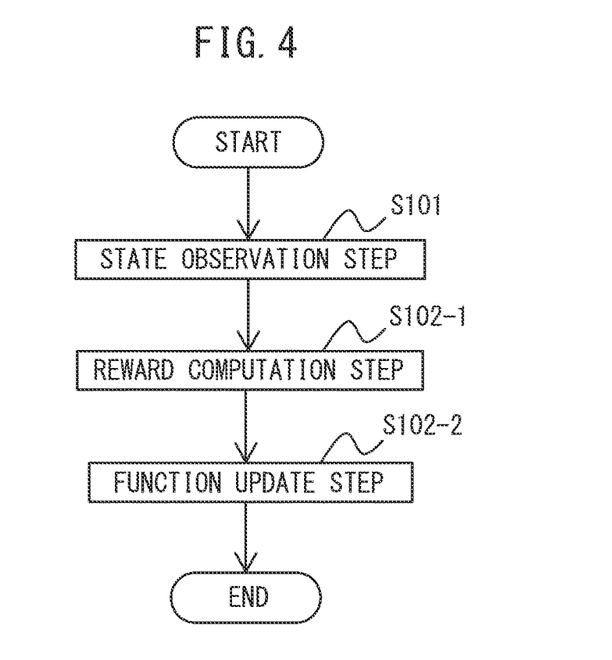
FIG. 4 is a flowchart illustrating the principle of a machine learning method using reinforcement learning according to the embodiment.

FIG. 4 is a flowchart illustrating the principle of a machine learning method using reinforcement learning according to the embodiment.

First, in state observation step S101, the state observation unit 11 observes a state variable including at least one of data associated with the value of a DC voltage in the DC link, data associated with the amount of power supply regeneration representing the amount of power returned from the DC link to the AC power supply by the power supply regeneration operation by the converter, and data associated with the occurrence or nonoccurrence of an overvoltage alarm indicating that the DC voltage of the DC link has exceeded a preset overvoltage alarm level.

In reward computation step S102-1, the reward computation unit 21 computes a reward based on the state variable observed in step S101.

In function update step S102-2, the function update unit 22 updates, based on the reward, a function for changing a power supply regeneration starting voltage representing a voltage defined in the DC link as a criterion for starting a power supply regeneration operation by the converter, and a power supply regeneration stopping voltage representing a voltage defined in the DC link as a criterion for stopping the power supply regeneration operation started by the converter.

A controller for a converter, including the above-described machine learning apparatus, and a motor control apparatus including the controller for a converter will be described next. The use of reinforcement learning as a learning algorithm for a learning unit will be taken as an example herein.

Figure 5:
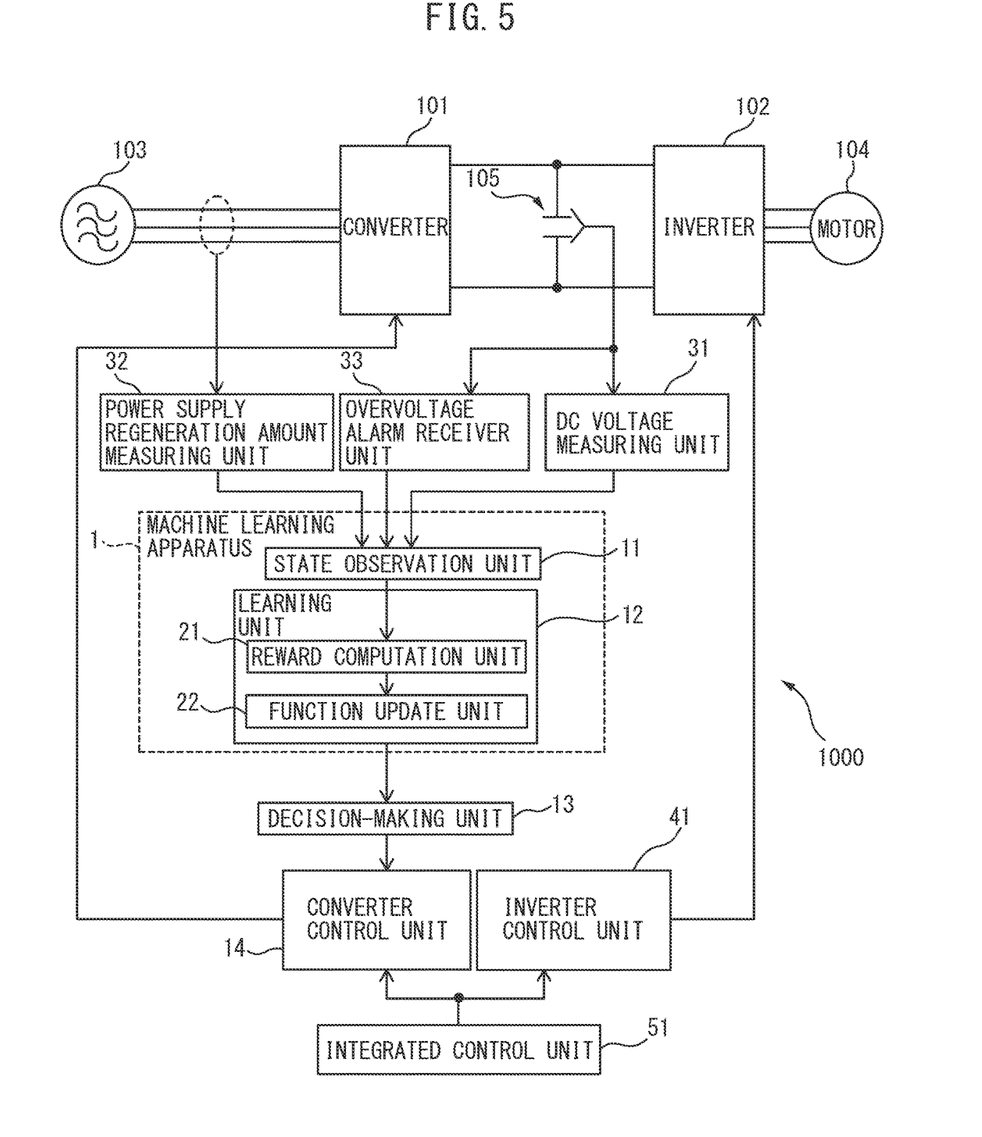
FIG. 5 is a principle block diagram illustrating a controller for a converter, including the machine learning apparatus according to the embodiment, and a motor control apparatus including the controller for a converter.

FIG. 5 is a principle block diagram illustrating a controller for a converter, including the machine learning apparatus according to the embodiment, and a motor control apparatus including the controller for a converter. Although a motor control apparatus 1000 which controls driving of one motor 104 will be described herein, the number of motors 104 controlled in driving by the motor control apparatus 1000 does not particularly limit the present invention and may be more than one. The type of motor 104 driven by the motor control apparatus 1000 does not particularly limit the present invention either, and an induction motor or a synchronous motor, for example, may be used. The number of phases does not particularly limit the present invention either, and not only a three-phase motor but also, e.g., a single-phase motor or a multi-phase motor other than a three-phase motor may be used.

The motor control apparatus 1000 includes, as its main circuit configuration, a converter 101, an inverter 102, and a DC link capacitor 105. The motor control apparatus 1000 has its three-phase AC input terminal connected to an AC power supply 103 and its AC motor-side terminal to a three-phase motor 104. For the sake of descriptive simplicity, FIG. 5 represents a control system for driving the motor 104, collectively as an inverter control unit 41. FIG. 5 does not illustrate an initial charging means used to raise the DC link voltage from 0 [V] to a voltage peak value for an AC power supply.

The converter 101 performs power conversion between AC power in the AC power supply 103 and DC power in the DC link on the DC side, in accordance with an instruction received from a converter control unit 14. In other words, the converter 101 serves as a bidirectionally AC/DC-convertible power converter which converts AC power supplied from the AC power supply 103 into DC power and outputs the DC power to the DC side, or converts DC power in the DC link into AC power and outputs the AC power to the AC power supply 103. The embodiment of the converter 101 is not particularly limited as long as it serves as a bidirectionally AC/DC-convertible power converter. Examples of the converter 101 may include a 120-degree conduction rectifying circuit and a PWM-controlled rectifying circuit. The converter 101 is implemented in a bridge circuit consisting of a switching element and a diode connected in inverse parallel to it. Examples of the switching element may include an IGBT, a thyristor, a GTO (Gate Turn-Off thyristor), and a transistor. However, the type of switching element itself does not particularly limit the present invention and other types of semiconductor elements may be employed. When, for example, the converter 101 serves as a PWM-controlled rectifier, its internal switching element controls, by switching, the converter 101 to produce AC power having a power factor of 1 and maintain the DC voltage applied across the two terminals of the DC link capacitor 105 at a desired value, and to perform a motoring operation (conversion operation) for converting AC power into DC power or a power supply regeneration operation (inversion operation) for converting DC power into AC power, in accordance with a PWM control signal generated by the converter control unit 14. When the motor 104 is decelerated under the control of the motor control apparatus 1000, regenerative power is produced by the motor 104. However, the converter 101 performs a power supply regeneration operation (inversion operation) for converting DC power into AC power as the switching operation of its internal switching element is controlled in accordance with a PWM control signal, to further return to the AC power supply 103, regenerative energy returned through the inverter 102.

The DC link capacitor 105 is provided in the DC link that connects the DC terminal of the converter 101 to that of the inverter 102. The DC link capacitor 105 has a function for storing DC power in the DC link and a smoothing function for suppressing pulsation of the DC output of the converter 101.

The inverter 102 is connected to the DC link and allows bidirectional power conversion between DC power in the DC link and AC power serving as drive power or regenerative power for the motor 104. In response to a motor driving instruction received from the inverter control unit 41, the inverter 102 performs a regeneration operation (inversion operation) for converting DC power into AC power or a motoring operation (conversion operation) for converting AC power into DC power. More specifically, based on a motor driving instruction received from the inverter control unit 41, the inverter 102 causes its internal switching element to convert, by switching, DC power supplied from the DC link into three-phase AC power having desired voltages and frequencies for driving the motor 104. The motor 104 thus operates based on the variable-voltage and -frequency three-phase AC power supplied. Regenerative power is generated upon deceleration of the motor 104. In this case, AC regenerative power generated by the motor 104 is converted into DC power and the DC power is returned to the DC link, based on a motor driving instruction received from the inverter control unit 41. When a plurality of motors 104 are controlled in driving by the motor control apparatus 1000, a parallel circuit consisting of inverters 102 equal in number to the motors 104 is formed to independently supply drive power to each motor 104 to control driving of the motors 104. The inverter 102 is implemented in a bridge circuit consisting of a switching element and a diode connected in inverse parallel to it, such as a PWM inverter. Examples of the switching element may include an IGBT, a thyristor, a GTO (Gate Turn-Off thyristor), and a transistor. However, the type of switching element itself does not particularly limit the present invention and other types of semiconductor elements may be employed.

The motor control apparatus 1000 includes, as a controller for the converter 101, the machine learning apparatus 1 using reinforcement learning described with reference to FIGS. 3 and 4, a decision-making unit 13, and a converter control unit 14.

The machine learning apparatus 1 includes a state observation unit 11 and a learning unit 12.

The state observation unit 11 observes a state variable including at least one of data associated with the value of a DC voltage in the DC link, data associated with the amount of power supply regeneration representing the amount of power returned from the DC link to the AC power supply 103 by the power supply regeneration operation by the converter 101, and data associated with the occurrence or nonoccurrence of an overvoltage alarm indicating that the DC link voltage has exceeded a preset overvoltage alarm level. The observed state variable is used for learning in the learning unit 12 as a training data set. The DC link voltage is measured by a DC voltage measuring unit 31 (e.g., a DC voltage measuring circuit), the amount of power supply regeneration of the converter 101 is measured by a power supply regeneration amount measuring unit 32 (e.g., a power supply regeneration amount measuring circuit), and data associated with the occurrence or nonoccurrence of an overvoltage alarm is received by an overvoltage alarm receiver unit 33 (e.g., an overvoltage alarm receiving circuit). The amount of power supply regeneration may be measured by the power supply regeneration amount measuring unit 32 through calculation based on the AC voltage and current on the side of the AC power supply 103 of the converter 101, through measurement using a watt-hour meter (not illustrated) located on the side of the AC power supply 103 of the converter 101, or through calculation based on the DC link voltage (i.e., the DC voltage measured by the DC voltage measuring unit 31) and the DC current output from the converter 101 to the DC link.

The reward computation unit 21 in the learning unit 12 computes a reward based on the state variable observed by the state observation unit 11.

Assume that data associated with the value of a DC link voltage is defined as a state variable. Then, the reward computation unit 21 increases the reward when the current DC link voltage observed by the state observation unit 11 is higher than the DC link voltage observed by the state observation unit 11 earlier than the current DC link voltage (i.e., when the DC link voltage has risen), and the reward computation unit 21 reduces the reward when the current DC link voltage observed by the state observation unit 11 is lower than the DC link voltage observed by the state observation unit 11 earlier than the current DC link voltage (i.e., when the DC link voltage has dropped). Again, the reward is increased when the DC link voltage has risen, and the reward is reduced when the DC link voltage has dropped. This is done because when the DC link voltage drops, the power available for the converter 101 lowers upon power failure or an instantaneous reduction in voltage.

Assume that data associated with the amount of power supply regeneration is defined as a state variable. Then, the reward computation unit 21 increases the reward when the current amount of power supply regeneration observed by the state observation unit 11 is smaller than the amount of power supply regeneration observed by the state observation unit 11 earlier than the current amount of power supply regeneration (i.e., when the amount of power supply regeneration has decreased), and the reward computation unit 21 reduces the reward when the current amount of power supply regeneration observed by the state observation unit 11 is larger than the amount of power supply regeneration observed by the state observation unit 11 earlier than the current amount of power supply regeneration (i.e., when the amount of power supply regeneration has increased). Again, the reward is increased when the amount of power supply regeneration has decreased, and the reward is reduced when the amount of power supply regeneration has increased. This is done because power supply regeneration by the converter causes a switching loss, leading to heat generation in the semiconductor switching element. Therefore, the larger the amount of power supply regeneration, the poorer the efficiency of a power supply regeneration operation by the converter.

Assume that data associated with the occurrence or nonoccurrence of an overvoltage alarm is defined as a state variable. Then, the reward computation unit 21 increases the reward when the nonoccurrence of an overvoltage alarm is observed by the state observation unit 11, and the reward computation unit 21 reduces the reward when the occurrence of an overvoltage alarm is observed by the state observation unit 11. Again, the reward is reduced when an overvoltage alarm has occurred. This is done because when the DC link voltage gets too high, the DC link capacitor and respective elements in the converter and the inverter may break down.

The function update unit 22 in the learning unit 12 updates a function for changing the power supply regeneration starting voltage and the power supply regeneration stopping voltage, based on the reward computed by the reward computation unit 21. In, e.g., Q-learning, the action value function $Q(s_t, a_t)$ presented in expression (1) is used as a function for changing the power supply regeneration starting voltage and the power supply regeneration stopping voltage.

The decision-making unit 13 decides the power supply regeneration starting voltage and the power supply regeneration stopping voltage in response to input of the current state variable, based on the result of learning by the learning unit 12 in accordance with the training data set. In this embodiment, reinforcement learning is used as an exemplary learning algorithm. The function update unit 22 in the learning unit 12 updates a function for changing the power supply regeneration starting voltage and the power supply regeneration stopping voltage, based on the reward computed by the reward computation unit 21 in the learning unit 12. The decision-making unit 13 selects a power supply regeneration starting voltage and a power supply regeneration stopping voltage which achieve the greatest reward, based on the updated function.

The converter control unit 14 controls the power conversion operation of the converter 101 that performs conversion between AC power in the AC power supply 103 and DC power in the DC link. While the converter control unit 14, as its basic operation, issues an instruction to the converter 101 to convert AC power supplied from the AC power supply 103 into DC power and output the DC power to the DC side, it issues an instruction to the converter 101 to perform a power regeneration operation in accordance with the DC link voltage measured by the DC voltage measuring unit 31. More specifically, the converter control unit 14 issues an instruction to the converter 101 to start a power supply regeneration operation when the DC link voltage rises and becomes higher than the power supply regeneration starting voltage, and, after the start of a power supply regeneration operation by the converter, issues an instruction to the converter to stop the power supply regeneration operation when the DC link voltage drops and becomes lower than the power supply regeneration stopping voltage. The power supply regeneration starting voltage and the power supply regeneration stopping voltage used for processing by the converter control unit 14 are decided by the decision-making unit 13, as described above. When the converter 101 serves as a PWM-controlled rectifier, each of the above-mentioned instructions is generated as a PWM control signal for PWM switching control of the switching element in the converter 101.

The inverter control unit 41 controls the power conversion operation of the inverter 102 that performs conversion between DC power in the DC link and AC power on the AC motor side. In other words, the inverter control unit 41 issues an instruction to the inverter 102 to perform a motoring operation (conversion operation) for converting AC power into DC power or a regeneration operation (inversion operation) for converting DC power into AC power, as a driving instruction for controlling the velocity, torque, or rotor position of the motor 104, using, e.g., an operation program for the motor 104, the AC current or voltage on the AC motor side of the inverter 102, and/or the rotational speed of the motor 104. When the inverter 102 serves as a PWM-controlled inverter, each of the above-mentioned instructions is generated as a PWM control signal for PWM switching control of the switching element in the inverter 102.

An integrated control unit 51 controls the overall, converter control unit 14 and inverter control unit 41.

Figure 6:
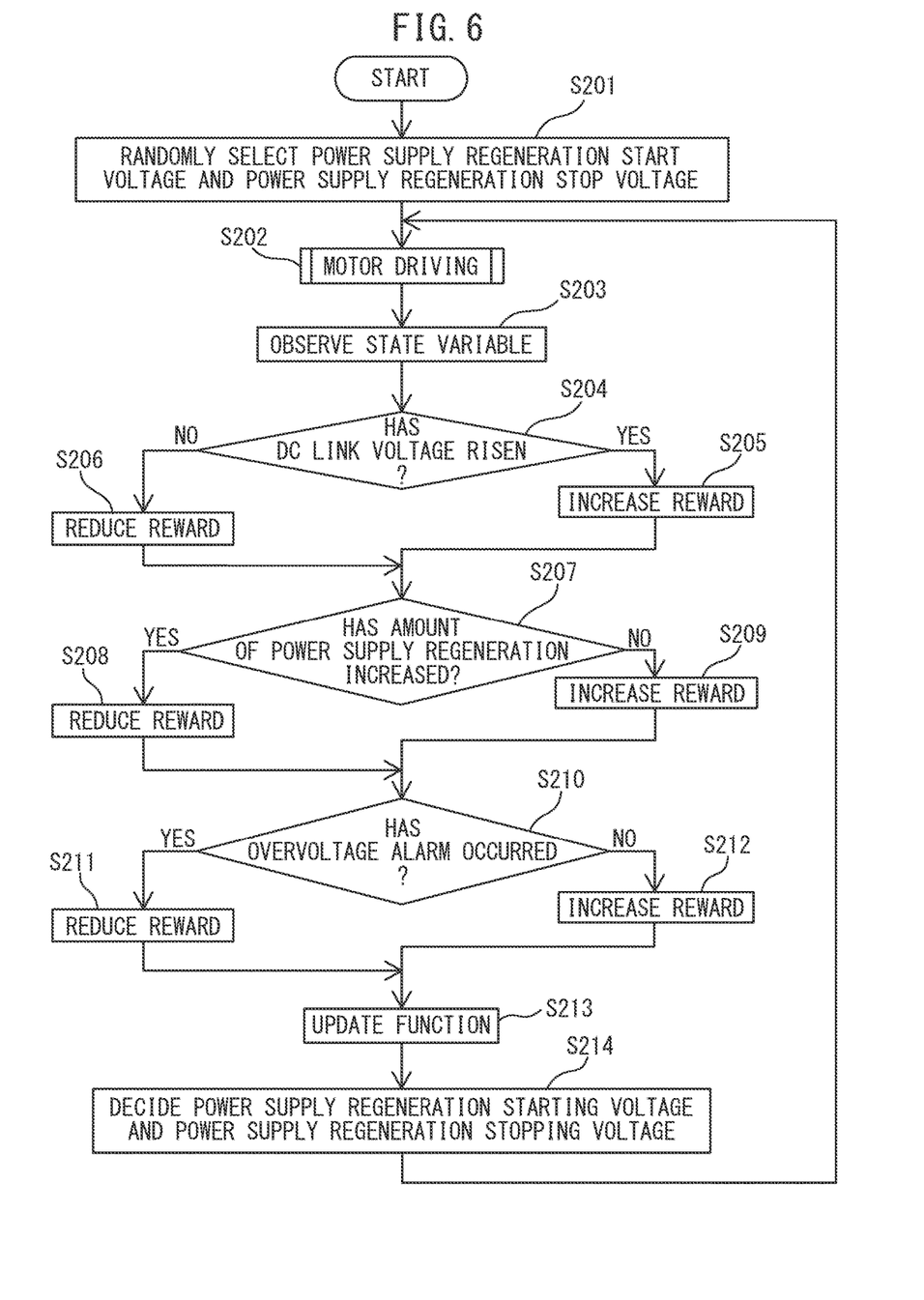
FIG. 6 is a flowchart illustrating the operation sequence of the machine learning apparatus using reinforcement learning according to the embodiment.

FIG. 6 is a flowchart illustrating the operation sequence of the machine learning apparatus using reinforcement learning according to the embodiment.

In general, an initial value for the action is randomly selected in reinforcement learning. In this embodiment, in step S201, initial values for the power supply regeneration starting voltage and the power supply regeneration stopping voltage defined as actions are randomly selected. Note that the power supply regeneration starting voltage may be preferably higher than the power supply regeneration stopping voltage.

In step S202, the integrated control unit 51 for the motor control apparatus 1000 issues instructions related to driving of the motor 104 to the converter control unit 14 and the inverter control unit 41. More specifically, the converter 101 converts AC power supplied from the AC power supply 103 into DC power and outputs the DC power to the DC side, in accordance with an instruction received from the converter control unit 14. The inverter 102 performs a motoring operation (conversion operation) for converting AC power into DC power or a regeneration operation (inversion operation) for converting DC power into AC power, in accordance with a motor driving instruction received from the inverter control unit 41. The motor 104 thus performs an acceleration, constant-speed, or deceleration operation.

In step S203, the state observation unit 11 observes, as a training data set, state variables including data associated with the value of a DC link voltage, data associated with the amount of power supply regeneration representing the amount of power returned from the DC link to the AC power supply 103 by the power supply regeneration operation by the converter 101, and data associated with the occurrence or nonoccurrence of an overvoltage alarm indicating that the DC link voltage has exceeded a preset overvoltage alarm level. Although these three pieces of data are defined as state variables as an example in this embodiment, it suffices to define at least one of them as a state variable.

In step S204, the state observation unit 11 observes whether the DC link voltage has risen. When the DC link voltage has risen, i.e., the observed current DC link voltage is higher than the DC link voltage measured earlier than the current DC link voltage, the reward computation unit 21 increases the reward in step S205. When the DC link voltage has dropped, i.e., the observed current DC link voltage is lower than the DC link voltage measured earlier than the current DC link voltage, the reward computation unit 21 reduces the reward in step S206.

In step S207, the state observation unit 11 observes whether the amount of power supply regeneration by the converter 101 has increased. When the amount of power supply regeneration has increased, i.e., the observed current amount of power supply regeneration is larger than the amount of power supply regeneration observed earlier than the current amount of power supply regeneration, the reward computation unit 21 reduces the reward in step S208. When the amount of power supply regeneration has decreased, i.e., the observed current amount of power supply regeneration is smaller than the amount of power supply regeneration observed earlier than the current amount of power supply regeneration, the reward computation unit 21 increases the reward in step S209.

In step S210, the state observation unit 11 observes whether an overvoltage alarm has occurred. When the occurrence of an overvoltage alarm is observed, the reward computation unit 21 reduces the reward in step S211. When the nonoccurrence of an overvoltage alarm is observed, the reward computation unit 21 increases the reward in step S212.

The processes in steps S204 to S206, the processes in steps S207 to S209, and the processes in steps S210 to S212, mentioned above, may be freely interchanged and executed.

In step S213, the function update unit 22 updates a function for changing the power supply regeneration starting voltage and the power supply regeneration stopping voltage, based on the reward computed by the reward computation unit 21.

In next step S214, the decision-making unit 13 selects a power supply regeneration starting voltage and a power supply regeneration stopping voltage which achieve the greatest reward, based on the function updated in step S213. The process then returns to step S202, in which the processes in steps S202 to S214 are iterated thereafter. With this operation, the machine learning apparatus 1 learns a power supply regeneration starting voltage and a power supply regeneration stopping voltage as conditions which are associated with a power supply regeneration operation and can achieve an efficient power supply regeneration operation of the converter 101. Training data sets may be obtained from a plurality of converters 101. In this case, the learning unit 12 iterates the processes in steps S201 to S214 in accordance with the training data sets obtained for the plurality of converters 101, to learn the power supply regeneration starting voltage and the power supply regeneration stopping voltage. Obtaining training data sets for the plurality of converters 101 improves the learning accuracy of the machine learning apparatus 1.

The state observation unit 11, the learning unit 12, and the decision-making unit 13 described above may be constructed in, e.g., the software program form or constructed by a combination of various electronic circuits and software programs. When, for example, these units are constructed in the software program form, the function of each of the above-mentioned units is implemented by operating the arithmetic processing unit in the motor control apparatus 1000 in accordance with the software program. Alternatively, the machine learning apparatus 1 including the state observation unit 11 and the learning unit 12 may be implemented as a semiconductor integrated circuit in which a software program for implementing the function of each unit is written. Or again, a semiconductor integrated circuit in which a software program for implementing the function of each unit is written may be implemented to include the decision-making unit 13, as well as the machine learning apparatus 1 including the state observation unit 11 and the learning unit 12.

Machine learning processing is performed using various types of data measured by the DC voltage measuring unit 31, the power supply regeneration amount measuring unit 32, and the overvoltage alarm receiver unit 33 intrinsically mounted in the motor control apparatus 1000 to control driving of a motor. This involves no new hardware device as in the conventional technique. This configuration is, therefore, also applicable to an existing motor control apparatus by retrofitting. In this case, it suffices to equip the existing motor control apparatus with a semiconductor integrated circuit in which a software program for implementing the function of each unit including the machine learning apparatus 1 and the decision-making unit 13 is written, or to additionally install on the arithmetic processing unit in the existing motor control apparatus, a software program for implementing the function of each unit including the machine learning apparatus 1 and the decision-making unit 13. Further, a machine learning apparatus 1 having learned a power supply regeneration starting voltage and a power supply regeneration stopping voltage for one motor control apparatus may be mounted in another motor control apparatus to re-learn and update the power supply regeneration starting voltage and the power supply regeneration stopping voltage for the other motor control apparatus.

The present invention attains a motor control apparatus which can efficiently perform a power supply regeneration operation for converting DC power in a DC link used to generate AC power for motor driving into AC power, and returning the AC power to an AC power supply, in a converter which generates DC power in the DC link by conversion from AC power in the AC power supply, a controller for a converter used for the motor control apparatus, and a machine learning apparatus and method for the controller for a converter.

According to the present invention, for an operating motor control apparatus, a machine learning apparatus itself adjusts a power supply regeneration starting voltage and a power supply regeneration stopping voltage which can achieve an efficient, appropriate power supply regeneration operation of a converter. This does not involve adjustment by a human in the design or operation stage of the motor control apparatus. In addition, since the use of the machine learning apparatus is sufficient for adjustment, conventionally complicated adjustment of the power supply regeneration operation of the converter for each machine in different operating states can be performed in a short time. Even for machines in the same operating states, the power supply regeneration operation of the converter can be adjusted in a shorter time by processing training data sets using a plurality of machine learning apparatuses in a distributed manner than by using only one machine learning apparatus. Adjusting the power supply regeneration starting voltage and the power supply regeneration stopping voltage makes it possible to prevent the occurrence of a DC link overvoltage alarm due to insufficiency of power supply regeneration, with less heat generation in the semiconductor switching elements in the converter and the inverter upon power supply regeneration. By exploiting the fact that keeping power supply regeneration less raises the DC link voltage, the machine can continue its operation using power stored in the DC link portion to cover shortage in power upon power failure or an instantaneous reduction in voltage. When neither power failure nor an instantaneous reduction in voltage occurs, power stored in the DC link portion is used upon an increase in output of the inverter so that no current flows into the semiconductor switching element in the converter until the DC link voltage becomes equal to or lower than a voltage peak value for an AC power supply. This allows less heat generation in the semiconductor switching element.

What is claimed is:

1. A machine learning apparatus for a controller to drive a motor within a machine or a robot, the learning apparatus is configured to learn a condition associated with a power supply regeneration operation for converting DC power in a DC link used to generate AC power for motor driving into AC power, and returning the AC power to an AC power supply, in a converter which generates DC power in the DC link by conversion from AC power in the AC power supply, the machine learning apparatus comprising:

a processor configured to
    observe a state variable comprising at least one of
        (1) data associated with a value of a DC voltage in the DC link, wherein the DC voltage is obtained by a DC voltage measuring circuit connected to the DC link,
        (2) data associated with an amount of power supply regeneration representing an amount of power returned from the DC link to the AC power supply by the power supply regeneration operation by the converter, wherein the amount of power supply regeneration is obtained by a power supply regeneration amount measuring circuit connected to a link between the AC power supply and the converter, and
        (3) data associated with an occurrence or a nonoccurrence of an overvoltage alarm indicating that the DC voltage of the DC link has exceeded a preset overvoltage alarm level, wherein the occurrence or nonoccurrence of the overvoltage alarm is obtained from an overvoltage alarm receiving circuit connected to the DC voltage measuring circuit; and
    learn a condition associated with the power supply regeneration operation by the converter, in accordance with a training data set defined by the state variable,
wherein the converter is controlled in accordance with the learned condition to convert the DC power in the DC link into the AC power to be returned to the AC power supply,
wherein the processor is further configured to:
    compute a reward based on the state variable, and
    update, based on the reward, a function for changing a power supply regeneration starting voltage representing a voltage defined in the DC link as a criterion for starting a power supply regeneration operation by the converter, and a power supply regeneration stopping voltage representing a voltage defined in the DC link as a criterion for stopping the power supply regeneration operation started by the converter.

2. The machine learning apparatus according to claim 1, wherein the processor is configured to increase the reward when a current DC voltage of the DC link is higher than a previous DC voltage of the DC link.

3. The machine learning apparatus according to claim 1, wherein the processor is configured to reduce the reward when a current DC voltage of the DC link is lower than a previous DC voltage of the DC link.

4. The machine learning apparatus according to claim 1, wherein the processor is configured to increase the reward when a current amount of power supply regeneration is smaller than a previous amount of power supply regeneration.

5. The machine learning apparatus according to claim 1, wherein the processor is configured to reduce the reward when a current amount of power supply regeneration is larger than a previous amount of power supply regeneration.

6. The machine learning apparatus according to claim 1, wherein the processor is configured to increase the reward when the nonoccurrence of the overvoltage alarm is observed.

7. The machine learning apparatus according to claim 1, wherein the processor is configured to reduce the reward when the occurrence of the overvoltage alarm is observed.

8. The machine learning apparatus according to claim 1, the processor is configured to learn the condition in accordance with the training data set obtained for a plurality of converters.

9. A controller for a converter, the controller comprising the machine learning apparatus according to claim 1, the controller configured to
    decide a power supply regeneration starting voltage and a power supply regeneration stopping voltage in response to input of a current state variable of the state variable, based on a result of learning by the processor in accordance with the training data set; and
    control the converter to perform power conversion between the AC power in the AC power supply and the DC power in the DC link,
    wherein the controller is configured to
        issue an instruction to the converter to start a power supply regeneration operation when the DC voltage of the DC link rises and becomes higher than the power supply regeneration starting voltage decided by the controller, and
        after start of the power supply regeneration operation by the converter, issue an instruction to the converter to stop the power supply regeneration operation when the DC voltage of the DC link drops and becomes lower than the power supply regeneration stopping voltage decided by the controller.

10. The controller according to claim 9, wherein the processor is configured to re-learn and update the condition in accordance with an additional training data set defined by the current state variable.

11. The controller according to claim 9, further comprising:
    the DC voltage measuring circuit configured to measure the DC voltage of the DC link;
    the power supply regeneration amount measuring circuit configured to measure the amount of power supply regeneration; and
    the overvoltage alarm receiving circuit configured to receive the data associated with the occurrence or nonoccurrence of the overvoltage alarm.

12. A motor control apparatus, comprising:
    the controller for a converter according to claim 9; and
    an inverter controller configured to control an inverter to perform power conversion between the DC power in the DC link and AC power on an AC motor side for driving a motor.

13. A machine learning method for a controller to drive a motor within a machine or a robot, the learning apparatus is configure to learn a condition associated with a power supply regeneration operation for converting DC power in a DC link used to generate AC power for motor driving into AC power, and returning the AC power to an AC power supply, in a converter which generates DC power in the DC link by conversion from AC power supplied from the AC power supply, the method comprising:
    observing by a processor a state variable comprising at least one of
        (1) data associated with a value of a DC voltage in the DC link, wherein the DC voltage is obtained by a DC voltage measuring circuit connected to the DC link,
        (2) data associated with an amount of power supply regeneration representing an amount of power returned from the DC link to the AC power supply by the power supply regeneration operation by the converter, wherein the amount of power supply regeneration is obtained by a power supply regeneration amount measuring circuit connected to a link between the AC power supply and the converter, and
        (3) data associated with an occurrence or a nonoccurrence of an overvoltage alarm indicating that the DC voltage of the DC link has exceeded a preset overvoltage alarm level, wherein the occurrence or nonoccurrence of the overvoltage alarm is obtained from an overvoltage alarm receiving circuit connected to the DC voltage measuring circuit; and
    learning by the processor a condition associated with the power supply regeneration operation by the converter, in accordance with a training data set defined by the state variable,
    wherein the converter is controlled in accordance with the learned condition to convert the DC power in the DC link into the AC power to be returned to the AC power supply,
    wherein the method further comprises:
        computing a reward based on the state variable; and
        updating, based on the reward, a function for changing a power supply regeneration starting voltage representing a voltage defined in the DC link as a criterion for starting a power supply regeneration operation by the converter, and a power supply regeneration stopping voltage representing a voltage defined in the DC link as a criterion for stopping the power supply regeneration operation started by the converter.

* * * * *